Patented July 27, 1937

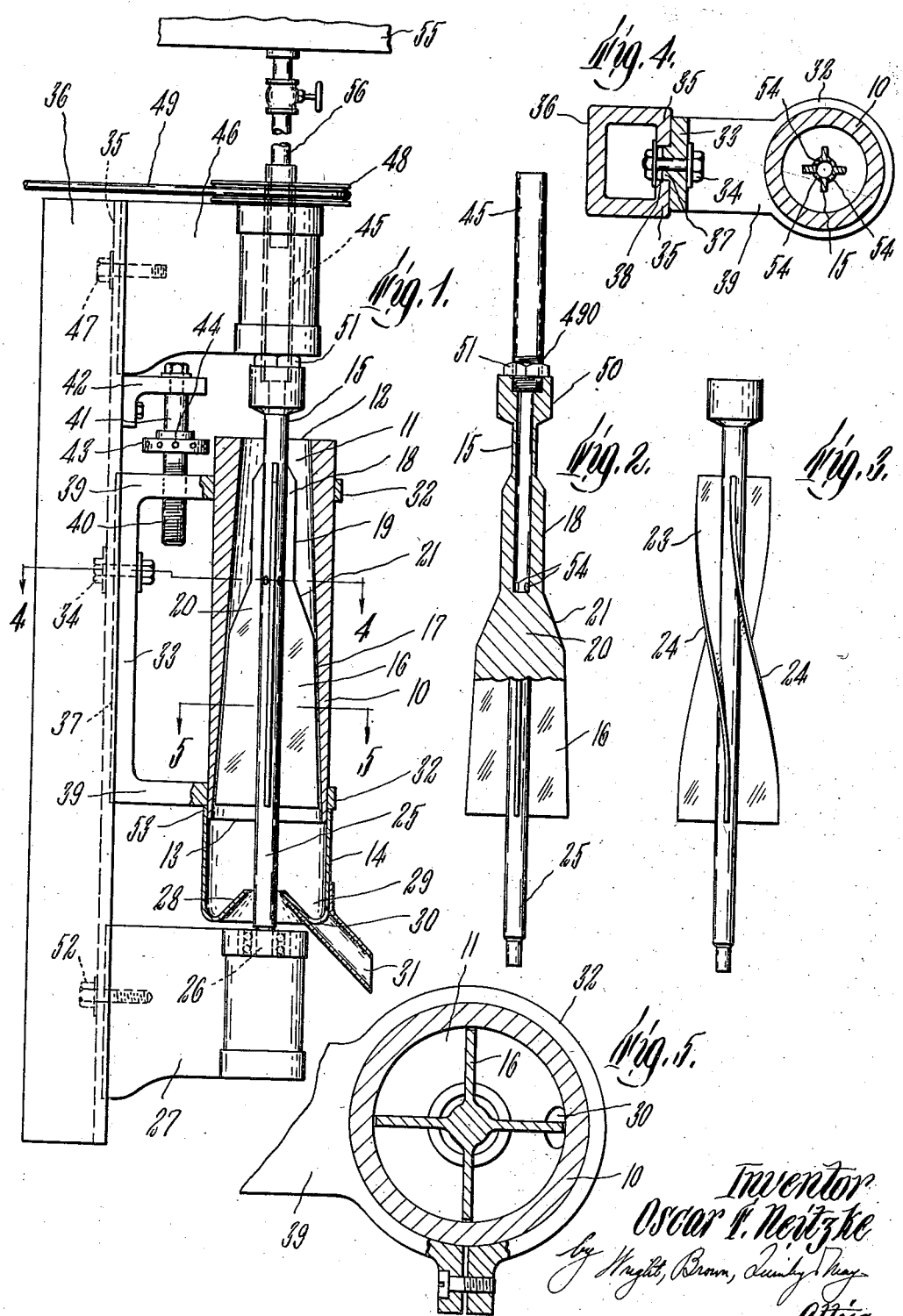

2,088,336

UNITED STATES PATENT OFFICE 2,088,336

MIXING, HOMOGENIZING, AND DISPERSING MACHINE

Oscar F. Neitzke, Belmont, Mass., assignor to Bennett Incorporated, Cambridge, Mass., a corporation of Massachusetts Application November 1, 1935, Serial No. 47,759

19 Claims. (Cl. 259—7)

This invention relates to a machine intended primarily for mixing, homogenizing, and dispersing various liquid or semi-liquid materials. Its objective, generally speaking, is to provide a machine which is of compact, simple, and sturdy construction, is capable of mixing, homogenizing, and dispersing various liquid or semi-liquid materials with high effectiveness, is easily adjusted to meet the requirements of various materials and the products to be produced therefrom, and is easily cleaned.

Briefly stated, the machine of the present invention comprises a substantially vertical, approximately tubular shell of progressively varying internal diameter from one end toward its other, a shaft extending substantially axially within the shell and carrying a plurality of mixing blades in spaced relationship thereon and extending lengthwise over a substantial portion thereof with their outer edges substantially conformed to the internal wall of the shell, means for causing relative vertical movement between the shell and the blades to vary the clearance between the blade outer edges and the shell wall, and means for rotating the shaft and the blades carried thereby at very high speed so that the outer blade edges exercise an intensive cutting or shearing action through material fed into the upper end of the shell as the material is being rapidly and repeatedly thrown by centrifugal force against the shell wall. The blade-carrying shaft is preferably assembled with the driving means of the machine in such a way as to be readily disconnectible therefrom and thus to permit the shaft and its blades to be readily withdrawn from the large diameter end of the shell. Again, the upper or material-receiving end of the shell is preferably left largely or completely open to enable an operator to pour material readily into the shell, as may be desired in preparing small or experimental amounts of a product, and to view what is going on in the mixing zone of the shell.

With the foregoing and other features and objects in view, the present invention will now be described in further detail with particular reference to the accompanying drawing, wherein,—

Figure 1 represents a composite side and sectional view of the machine as a whole, the shell portion of the machine being shown in section.

Figure 2 is a front view, partly in section, of the mixing shaft and its blades removed from the machine.

Figure 3 shows the shaft with a modified form of blade.

Figures 4 and 5 are sections on the lines 4—4 and 5—5, respectively, of Figure 1.

The machine includes a substantially vertical approximately tubular shell 10 whose nicely finished bore or interior wall 11 is of progressively increasing diameter from its upper end 12 to its lower end 13. When I say that the shell is approximately tubular, I mean that, as appears in Figure 1, its bore varies only slightly in diameter so as to enable merely an adjustment of the clearance between the outer edges of mixing blades and the internal shell wall, as hereinafter described. The upper end 12 is preferably left completely open, whereas the lower end 13 is preferably largely closed off by a removable discharge cup 14. Passing substantially axially through the shell is a relatively small diameter shaft 15 carrying in spaced relationship a plurality of mixing and shearing blades whose lower portions 16 extend lengthwise of the shaft and occupy a substantial portion of its length. As shown, there may be four such blades 16 projecting substantially radially from the shaft 15 and separated about 90° from one another. The outer edges 17 of the lower blade portions 16 may be inclined so as to conform accurately to the internal wall of the shell, these edges being relied upon to exercise shearing action on material fed into the shell and preferably being of considerable length, for instance, about one-half that of the shell. Since the blades are relatively thin and occupy, as appears more particularly in Figure 4, only a comparatively small portion of the cross-sectional area of the chamber defined by the shell, they can, as hereinafter described in further detail, serve at high rotational speed to throw material fed into the shell under intensive centrifugal force against the wall of the shell as well as to cut through the material thus thrown on the wall of the shell and hence, by virtue of the intensive centrifugal spattering and cutting of the material effected thereby, to mix, homogenize, and disperse the material with high effectiveness. The upper blade portions 18 may be of distinctly smaller radius than the lower portions 16 and have substantially vertical edges 19 spaced considerably from the shell wall, such upper blade portions effecting a preliminary intensive mixing of material immediately as it enters the shell. Between the upper and lower blade portions 16 may be comparatively short intermediate blade portions 20 whose outer edges 21 are inclined toward the blade edges 17 and define together with the shell wall during the rotation of the blades an annular space of progressively decreasing diameter leading into the slight clearance between the lower blade edges 17 and the shell wall. The upper blade portions 18 may terminate somewhat below the open upper end 12 of the shell. By virtue of the substantial verticality of the shell and the mixing shaft, once they are properly aligned with upper and lower end shaft bearings presently to be described, there is little tendency for their misalignment on account of their weight, as the thrust on the bearings is essentially an end thrust. This means that the desired substantially uniformly slight clearance can be maintained between the shearing edges 17 and the entire shell wall as the blades are being rotated. Moreover, such vertical arrangement of the shell makes possible substantially maximum gravitational feed pressure or liquid head for a particular volume of material in the shell; and it is unnecessary to rely upon extraneous or feed pressure upon material being introduced into the shell to realize the desired discharge therefrom.

While the blades of Figures 1 and 2 are desirable when a progressively intensified action on material is desired, nevertheless the blades as a whole may have outer edges in substantial conformity to the shell wall so as to exert substantially the same action on the material throughout their length. Such latter mixing blades appear in Figure 3, wherein the four blade elements 23 are shown as making a very gradual spiral turn on their shaft and as presenting continuous or smooth outer edges 24 of progressively increasing radius from their upper to their lower ends corresponding substantially to the progressively increasing radius of the shell.

The lower end portion 25 of the mixing shaft 15 may project beyond the open lower end 13 of the shell and out through the bottom of the discharge cup 14 into a step-bearing 26 forming part of a vertically movable bracket 27. The cup-bottom portion 28 surrounding the shaft portion 25 may be of frusto-conical shape, as shown, and define an annular material-receiving space 29 having a bottom opening 30 through which material may flow into an outwardly inclined discharge spout 31 forming part of the cup. The spout may serve to direct the discharged material into barrels or other suitable collectors for storage or shipment.

Provision is made for causing relative vertical movement between the shell 10 and the blades 16 and thus varying the clearance between the blade outer edges 17 and the shell wall, as may be desirable. Preferably, as shown, the shell is supported for vertical movement by a pair of ring-shaped upper and lower brackets 32 projecting horizontally outwardly from a common vertical bar 33 normally secured, as by a bolt 34, to flanges 35 inwardly directed at the leg edges of a vertical U-beam 36. The bar 33 may be provided with an outwardly projecting vertical tongue 37 slidably engaging the flange edges 38 and thus serving to guide the bar in its vertical movement. The arm portion 39 of the upper bracket 32 may be supported during vertical movement or adjustment of the shell by a screw element 40 passing vertically therethrough and in threaded engagement therewith and affording means by which vertical movement of the shell may be effected. To this end, the upper end portion 41 of the screw element is shown unthreaded and rotatably secured in a stationary bracket 42 fixed to the flanges 35 somewhat above the arm portion 39. A hand wheel 43 may be arranged on the screw element 40 immediately above its threaded portion, the wheel shown being provided with openings or other indicia 44 in its periphery to guide the operator in the precise setting or clearance of the blade edges 17 at any time relative to the internal shell wall. In adjusting the clearance, all the operator need do is loosen the bolt 34 and turn the hand wheel 43 over the appropriate angularity or number of revolutions and thus to move the shell vertically toward or away from the blade edges 17 to the desired degree, whereupon the bolt 34 may be tightened and the machine put into operation.

The shaft 15 projects beyond the upper end 12 of the shell and is disconnectibly secured to a shaft piece or extension 45 journaled for rotation in a bracket 46 fixed as by a bolt 47 to the flanges 35 in the same way as the bracket bar 33. The upper end portion of the shaft piece 45 may project beyond the upper face of the bracket 46 and carry affixed thereto a pulley 48 driven by a belt 49 from an electric motor or other suitable prime mover (not shown). In order to enable easy removal of the shaft 15 and the blades carried thereby through the open lower end of the shell, the connection between the shaft 15 and the shaft piece 45 preferably occurs below the lower face of the bracket 46, the connection being made, for example, by threading the lower end portion 490 of such shaft piece 45 into an enlarged upper end portion 50 of such shaft 15. It is preferable to provide additionally a nut 51 at the threaded portion 490 capable of being tightened or clamped over the upper end of the portion 50 to ensure against separation of the shaft parts during rotation of the shaft. Withdrawal of the shaft 15 and its blades from the shell may be readily accomplished by moving the bracket 27 downwardly so as to disengage the step-bearing 26 from the lower end portion 25 thereof and then removing it from its supporting beam 36, thereby enabling the disengagement of the cup 14 from the lower end portion of the shell so as to open the lower end 12 of the shell for the withdrawal of the shaft 15 after its disconnection from the shaft piece 45. The desired easy removability of the bracket 27 may be had by fixing it, as by a bolt 52, to the beam 36 in the same way as the bracket bar 33; and the desired easy removability of the cup 14 may be had by frictionally engaging its upper wall portion 53 over the lower end portion of the shell.

The material to be acted upon may be poured directly into the shell 10 through its upper end either discontinuously by the operator or continuously as from one or more pipe outlets (not shown) arranged over or brought directly into the upper end. In some instances, it may be desirable to deliver diluting water, cooling water, or other material into the mixing and/or shearing zones of the shell at one or more points, in which cases, the shaft piece 45 and the shaft 15 are, as illustrated, made hollow and the shaft 15 provided with discharge apertures 54 at such points. Material may be fed, as shown, from a tank 55 arranged above the upper end of the shaft piece 45 and equipped with a valved outlet pipe 56 fitting loosely into the hollow of the shaft piece 45. The material thus passes downwardly through the intercommunicating hollows of the shaft piece 45 and shaft 15 and out through the apertures 54 into the desired zone of the shell.

The shaft 15 and the blades carried thereby are depicted in Figure 2 as being formed as a a discharge orifice for said material, a shaft extending substantially axially within said shell and of small diameter relative to said shell, a plurality of blades carried in spaced relationship by said shaft, the blades extending lengthwise of said shaft and occupying a substantial portion of the length of said shell and their outer edges being substantially conformed to the internal wall of said shell, but said blades being relatively thin and occupying only a comparatively small portion of the cross-sectional area of the chamber defined by said shell, means for causing relative vertical movement between said shell and said blades to vary the clearance between said blade outer edges and said shell wall, and means for rotating said shaft and the blades carried thereby.

5. A machine of the class described comprising a substantially vertical, approximately tubular, elongated shell of progressively and only slightly varying internal diameter, a shaft of relatively small diameter extending substantially axially within said shell and projecting beyond the ends thereof, a plurality of blades carried in spaced relationship by said shaft, the blades extending lengthwise of said shaft and occupying a substantial portion of the length of said shell and their outer edges being substantially conformed to the internal wall of said shell, but said blades being relatively thin and occupying only a comparatively small portion of the cross-sectional area of the chamber defined by said shell, bearings for the end portions of said shaft, means for rotating said shaft at one end portion thereof, said shaft being made as at least two disconnectible pieces and said pieces being disconnectible between the small diameter end of said shell and the bearing adjacent thereto, and means for removing the bearing adjacent to the large diameter end of said shell from the shaft, whereby, upon disconnecting the two shaft pieces between the small diameter end of said shell and the bearing adjacent thereto, the shaft and the blades carried thereby may be withdrawn through the large diameter end of said shell.

6. A machine of the class described comprising a substantially vertical, approximately tubular shell of progressively and only slightly increasing internal diameter toward its lower end, the upper end of said shell being largely open, a closure removably connected to the lower end portion of said shell and having an outlet opening through which material in said shell may be discharged, a shaft extending substantially axially within said shell and projecting beyond the ends thereof, a plurality of blades carried in spaced relationship by said shaft, the blades extending lengthwise of said shaft and occupying a substantial portion of the length of said shell and their outer edges being substantially conformed to the internal wall of said shell, bearings for the end portions of said shaft, means for rotating said shaft at one end portion thereof, said shaft being made as at least two disconnectible pieces and said pieces being disconnectible between the upper end of said shell and the upper bearing, and means for removing the lower bearing from the lower end portion of said shaft, whereby, upon disconnecting said two shaft pieces between the upper end of the shell and said upper bearing, removing the closure from the lower end portion of said shell, and removing the lower bearing from the lower end portion of said shaft, the shaft and the blades carried thereby may be withdrawn through the lower end of said shell.

7. A machine of the class described comprising a substantially vertical, approximately tubular shell of progressively and only slightly varying internal diameter, a shaft extending substantially axially within said shell and projecting beyond the ends thereof, a plurality of blades carried in spaced relationship by said shaft, the blades extending lengthwise of said shaft and occupying a substantial portion of the length of said shell and their outer edges being substantially conformed to the internal wall of said shell, bearings for the end portions of said shaft, means for rotating said shaft at one end portion thereof, means for causing relative vertical movement between said shell and said blades to vary the clearance between said blade outer edges and said shell wall, said shaft being made as at least two disconnectible pieces and said pieces being disconnectible between the small diameter end of said shell and the bearing, and means for removing the bearing adjacent to the large diameter end of said shell from the shaft, whereby, upon disconnecting the two shaft pieces between the small diameter end of said shell and the bearing adjacent thereto, the shaft and the blades carried thereby may be withdrawn through the large diameter end of said shell.

8. A machine of the class described comprising a substantially vertical, approximately tubular shell of progressively and only slightly increasing internal diameter toward its lower end, the upper end of said shell being largely open, a closure removably connected to the lower end portion of said shell and having an outlet opening through which material in said shell may be discharged, a shaft extending substantially axially within said shell and projecting beyond the ends thereof, a plurality of blades carried in spaced relationship by said shaft, the blades extending lengthwise of said shaft and occupying a substantial portion of the length of said shell and their outer edges being substantially conformed to the internal wall of said shell, bearings for the end portions of said shaft, means for rotating said shaft at one end portion thereof, means for causing vertical movement of said shell to vary the clearance between said blade outer edges and said shell wall, said shaft being made as at least two disconnectible pieces and said pieces being disconnectible between the upper end of said shell and the upper bearing, and means for removing the bearing from the lower end portion of said shaft, whereby, upon disconnecting said two shaft pieces between the upper end of the shell and said upper bearing, removing the closure from the lower end portion of said shell, and removing the lower bearing from the lower end portion of said shaft, the shaft and the blades carried thereby may be withdrawn through the lower end of said shell.

9. A machine of the class described comprising a substantially vertical, approximately tubular shell of progressively and only slightly varying internal diameter, a shaft of relatively small diameter extending substantially axially within said shell, a plurality of blades carried in spaced relationship by said shaft, said blades extending lengthwise of said shaft and occupying a substantial portion of the length of said shell and their outer edges being substantially conformed to the internal wall of said shell, but said blades being relatively thin and occupying single casting. However, when the configuration of the blades is such that casting or machining difficulties would be encountered if the blades were cast as one piece with their shaft, as when the blades make the spiral turns illustrated in Figure 3, the blades may be formed as separate pieces and be suitably secured to the shaft. While a particular form of machine embodying the principles of the present invention has been described and illustrated herein, it is to be understood that such machine is susceptible of modification. For instance, it is entirely feasible to drive the shaft 15 at its lower end portion rather than at its upper end portion and to provide a shaft piece or extension from which the shaft 15 is disconnectible at its lower end portion. Again, particularly when the shaft 15 is driven and disconnectible at its lower end portion, the shell 10 may be of progressively increasing internal diameter toward its upper end in lieu of toward its lower end and the outer blade edges 17 may be conformed or mated with the internal wall of such shell and thus be removable through the upper end of the shell. It appears unnecessary to describe such possible modifications further or to describe or illustrate the details necessary for their completion, as these will readily suggest themselves to the experienced machine builder.

The machine of the present invention is designed to be run at very high speeds, the shaft 15 preferably being rotated at a speed of about 5000 to 7000 R. P. M. and not less than about 4000 R. P. M. Under these conditions, the material delivered into the shell is spattered intensively and repeatedly against the wall of the shell and the outer blade edges 17, which are adjusted to clear the wall only slightly, act to cut or shear through the new material being very rapidly and repeatedly brought to the wall by intensive centrifugal force. The machine is hence highly effective in producing dispersions of all sorts including aqueous dispersions of sizes, bitumens, and other thermo-plastic material, aqueous emulsions of oil or other water-miscible bodies, particularly when the aqueous medium in which dispersion or emulsion is being effected contains a suitable protective colloid acting to stabilize the microscopic or colloidally fine particles as they are being generated in the shell. The machine is also very well suited for use in homogenizing various materials, for instance, such food products as milk, cream, ice cream, mayonnaise, etc., in which latter connections it has the desirable feature of being easily cleaned after use. When making aqueous dispersions of thermoplastic material, such as wax, it is usually desirable to feed independently such material in molten condition and the aqueous medium in hot condition into the shell; and it may also be desirable to maintain the thermoplastic material molten throughout the dispersing operation in order to promote its resolution into dispersed particles of finest colloidal size. In such case, the shell 10 may be partly or completely jacketed and steam, hot water, or other suitable heating medium passed through the jacket. The jacketing of the shell with heating medium may also be desirable when rosin or similar soap-forming constituent represents part of the thermoplastic melt and such melt is delivered into the shell along with an alkaline aqueous medium, such as caustic soda solution, to produce soap stabilizer for the resulting aqueous dispersion of thermoplastic material. There are instances other than saponification when the development of stabilizer by reaction between the materials fed into the shell is favored by jacketing of the shell with heating medium. In still other instances, it may be desirable to jacket the shell with cold water or other cooling medium, as when an ice cream mix is being homogenized therein.

I claim:—

1. A machine of the class described comprising a substantially vertical, approximately tubular, elongated shell of progressively and only slightly varying internal diameter, a shaft of relatively small diameter extending substantially axially within said shell, a plurality of blades carried in spaced relationship by said shaft, said blades extending lengthwise of said shaft and occupying a substantial portion of the length of said shell and their outer edges being substantially conformed to the internal wall of said shell, but said blades being relatively thin and occupying only a comparatively small portion of the cross-sectional area of the chamber defined by said shell, means for causing relative vertical movement between said shell and said blades to vary the clearance between said blade outer edges and said shell wall, and means for rotating said shaft and the blades carried thereby.

2. A machine of the class described comprising a substantially vertical, approximately tubular, elongated shell of progressively and only slightly varying internal diameter, a shaft of relatively small diameter extending substantially axially within said shell, a plurality of blades carried in spaced relationship by said shaft, said blades extending lengthwise of said shaft and occupying a substantial portion of its length and their outer edges being substantially conformed to the internal wall of said shell, but said blades being relatively thin and occupying only a comparatively small portion of the cross-sectional area of the chamber defined by said shell, means for causing vertical movement of said shell to vary the clearance between said blade outer edges and said shell wall, and means for rotating said shaft and the blades carried thereby.

3. A machine of the class described comprising a substantially vertical, approximately tubular, elongated shell of progressively and only slightly varying internal diameter, said shell being largely open at its upper end to receive material thereat but being largely closed at its lower end excepting for a discharge orifice for said material, a discharge spout arranged at said orifice and adapted to direct material discharged through said orifice away from said shell, a shaft extending substantially axially within said shell and of small diameter relative to said shell, a plurality of blades carried in spaced relationship by said shaft, said blades extending lengthwise of said shaft and occupying a substantial portion of the length of said shell and their outer edges being substantially conformed to the internal wall of said shell, but said blades being relatively thin and occupying only a comparatively small portion of the cross-sectional area of the chamber defined by said shell, and means for rotating said shaft and the blades carried thereby.

4. A machine of the class described comprising a substantially vertical, approximately tubular, elongated shell of progressively and only slightly increasing internal diameter toward its lower end, the upper end of said shell being largely open to receive material thereat and the lower end of said shell being largely closed excepting for only a comparatively small portion of the cross-sectional area of the chamber defined by said shell, and said shaft being hollow from its upper end to a point within said shell and being apertured at at least one point within said shell to establish communication between said shell interior and said hollow, whereby fluent material fed into the upper end of said shaft will flow through said hollow and aperture into said shell, and means for rotating said shaft and the blades carried thereby.

10. A machine of the class described comprising an approximately tubular, elongated shell of progressively and only slightly varying internal diameter, a shaft of relatively small diameter extending substantially axially within said shell, at least four blades projecting substantially radially from said shaft at 90° intervals and occupying a substantial portion of the length of said shell and their outer edges being substantially conformed to the internal wall of said shell, but said blades being relatively thin and occupying only a comparatively small portion of the cross-sectional area of the chamber defined by said shell, means for causing relative axial movement between said shell and said blades to vary the clearance between said blade outer edges and said shell wall, and means for rotating said shaft and the blades carried thereby.

11. A machine of the class described comprising an approximately tubular shell of progressively and only slightly varying internal diameter, a shaft of relatively small diameter extending substantially axially within said shell, a plurality of blades projecting substantially radially from said shaft, said blades extending lengthwise of said shaft and occupying a substantial portion of the length of said shell and their outer edges being substantially conformed to the internal wall of said shell, but said blades being relatively thin and occupying only a comparatively small portion of the cross-sectional area of the chamber defined by said shell, means for causing relative axial movement between said shell and said blades to vary the clearance between said blade outer edges and said shell wall, and means for rotating said shaft and the blades carried thereby.

12. A machine of the class described comprising an approximately tubular, elongated shell of progressively and only slightly varying internal diameter, a shaft of relatively small diameter extending substantially axially within said shell, at least four blades projecting substantially radially from said shaft at 90° intervals and occupying a substantial portion of the length of said shell and their outer edges being substantially conformed to the internal wall of said shell, but said blades being relatively thin and occupying only a comparatively small portion of the cross-sectional area of the chamber defined by said shell, means for causing relative axial movement between said shell and said blades to vary the clearance between said blade outer edges and said shell wall, and means for rotating said shaft and the blades carried thereby.

13. A machine of the class described comprising an approximately tubular shell of progressively and only slightly varying internal diameter, a shaft of relatively small diameter extending substantially axially within said shell, a plurality of blades projecting substantially radially from said shaft, said blades extending lengthwise and spirally of said shaft and occupying a substantial portion of the length of said shell and their outer edges being substantially conformed to the internal wall of said shell, but said blades being relatively thin and occupying only a comparatively small portion of the cross-sectional area of the chamber defined by said shell, and means for rotating said shaft and the blades carried thereby.

14. A machine of the class described comprising an approximately tubular, elongated shell of progressively and only slightly varying internal diameter, a shaft of relatively small diameter extending substantially axially within said shell, a plurality of blades projecting substantially radially from said shaft, said blades extending lengthwise and spirally of said shaft and occupying a substantial portion of the length of said shell and their outer edges being substantially conformed to the internal wall of said shell, but said blades being relatively thin and occupying only a comparatively small portion of the cross-sectional area of the chamber defined by said shell, means for causing relative axial movement between said shell and said blades to vary the clearance between said blade outer edges and said shell wall, and means for rotating said shaft and the blades carried thereby.

15. A machine of the class described comprising a substantially vertical, approximately tubular, elongated shell of progressively and only slightly varying internal diameter, a shaft of relatively small diameter extending substantially axially within said shell, a plurality of longitudinally extending blades carried in spaced relationship by said shaft and occupying a substantial portion of the length of said shell, said blades comprising lower blade portions whose outer edges are substantially conformed to the internal wall of said shell and clear said wall only slightly and upper blade portions whose outer edges clear said wall by a much greater distance than the outer edges of said lower blade portions, but said blades being relatively thin and occupying only a comparatively small portion of the cross-sectional area of the chamber defined by said shell, and means for rotating said shaft and the blades carried thereby.

16. A machine of the class described comprising a substantially vertical, approximately tubular, elongated shell of progressively and only slightly varying internal diameter, a shaft of relatively small diameter extending substantially axially within said shell, a plurality of longitudinally extending blades carried in spaced relationship by said shaft and occupying a substantial portion of the length of said shell, said blades comprising lower blade portions whose outer edges are substantially conformed to the internal wall of said shell and clear said wall only slightly and upper blade portions whose outer edges clear said wall by a much greater distance than the outer edges of said lower blade portions, but said blades being relatively thin and occupying only a comparatively small portion of the cross-sectional area of the chamber defined by said shell, means for causing relative vertical movement between said shell and said blades to vary the clearance between the outer edges of said lower blade portions and said shell wall, and means for rotating said shaft and blades carried thereby.

17. A machine of the class described comprising a substantially vertical, approximately tubular, elongated shell of progressively and only slightly varying internal diameter, a shaft of relatively small diameter extending substantially axially within said shell, a plurality of longitudinally extending blades carried in spaced relationship by said shaft and occupying a substantial portion of the length of said shell, said blades comprising lower blade portions whose outer edges are substantially conformed to the internal wall of said shell and clear said wall only slightly, upper blade portions whose outer edges clear said wall by a much greater distance than the outer edges of said lower blade portions, and intermediate blade portions whose outer edges clear said wall by a distance gradually decreasing downwardly of said shell from that of the outer edges of said upper blade portions to that of the outer edges of said lower blade portions, but said blades being relatively thin and occupying only a comparatively small portion of the cross-sectional area of the chamber defined by said shell, and means for rotating said shaft and the blades carried thereby.

18. A machine of the class described comprising a substantially vertical, approximately tubular, elongated shell of progressively and only slightly varying internal diameter, a shaft of relatively small diameter extending substantially axially within said shell, a plurality of longitudinally extending blades carried in spaced relationship by said shaft and occupying a substantial portion of the length of said shell, said blades comprising lower blade portions whose outer edges are substantially conformed to the internal wall of said shell and clear said wall only slightly, upper blade portions whose outer edges clear said wall by a much greater distance than the outer edges of said lower blade portions, and intermediate blade portions whose outer edges clear said wall by a distance gradually decreasing downwardly of said shell from that of the outer edges of said upper blade portions to that of the outer edges of said lower blade portions, but said blades being relatively thin and occupying only a comparatively small portion of the cross-sectional area of the chamber defined by said shell, means for causing vertical movement of said shell to vary the clearance between the outer edges of said blade portions and said shell wall, and means for rotating said shaft and the blades carried thereby.

19. A machine of the class described comprising a substantially vertical, approximately tubular, elongated shell having a substantially smooth internal wall and of progressively and only slightly varying internal diameter, a shaft of relatively small diameter extending substantially axially within said shell, a plurality of blades carried in spaced relationship by said shaft, said blades extending substantially vertically and occupying a substantial portion of the length of said shell and their outer edges being substantially conformed to the internal wall of said shell, but said blades being relatively thin and occupying only a comparatively small portion of the cross-sectional area of the chamber defined by said shell, means for causing relative vertical movement between said shell and said blades to vary the clearance between said blade outer edges and said shell wall, and means for rotating said shaft and the blades carried thereby.

OSCAR F. NEITZKE.